United States Patent
Routh

[11] Patent Number: 5,832,704
[45] Date of Patent: Nov. 10, 1998

[54] MOWER BLADE ASSEMBLY

[76] Inventor: S. Jack Routh, 2508 Atlanta St., Greensboro, N.C. 27406

[21] Appl. No.: 746,390

[22] Filed: Nov. 8, 1996

[51] Int. Cl.$^6$ .............................. A01D 34/82; A01D 87/10
[52] U.S. Cl. ................................. 56/13.4; 56/17.5; 56/295
[58] Field of Search ......................... 56/17.5, 255, 295, 56/DIG. 17, 320.1, 16.9, 12.8, 13.4

[56] References Cited

U.S. PATENT DOCUMENTS

| | | | |
|---|---|---|---|
| 3,959,955 | 6/1976 | Smith et al. .............................. | 56/17.5 |
| 4,057,952 | 11/1977 | Brokaw ..................................... | 56/16.9 |
| 4,269,020 | 5/1981 | Wolf ........................................ | 56/295 |
| 4,890,446 | 1/1990 | Israel ....................................... | 56/17.5 |
| 5,012,633 | 5/1991 | Ito et al. ............................... | 56/16.9 X |
| 5,109,656 | 5/1992 | Zimmer .................................... | 56/17.5 |
| 5,142,851 | 9/1992 | Lydy et al. ............................. | 56/17.5 X |
| 5,191,756 | 3/1993 | Kuhn ........................................ | 56/17.5 |
| 5,321,940 | 6/1994 | Peterson ................................... | 56/255 |
| 5,373,687 | 12/1994 | Secord ..................................... | 56/17.5 |
| 5,435,118 | 7/1995 | Cobile ................................... | 56/16.9 X |
| 5,669,213 | 9/1997 | Britton ................................... | 56/255 X |

*Primary Examiner*—Heather Shackelford

[57] ABSTRACT

A blade assembly is provided for a lawn mower which includes first and second fan blades to maintain the interior of the blade housing free of accumulated grass clippings as occur when mowing damp or wet grass. The blade assembly includes a conventional grass cutting blade and two axially spaced and radially displaced fan blades which are affixed to the engine shaft, above the cutting blade. The fan blades create sufficient turbulence within the housing to prevent grass accumulation, thereby improving the ability and efficiency of the mower.

16 Claims, 3 Drawing Sheets

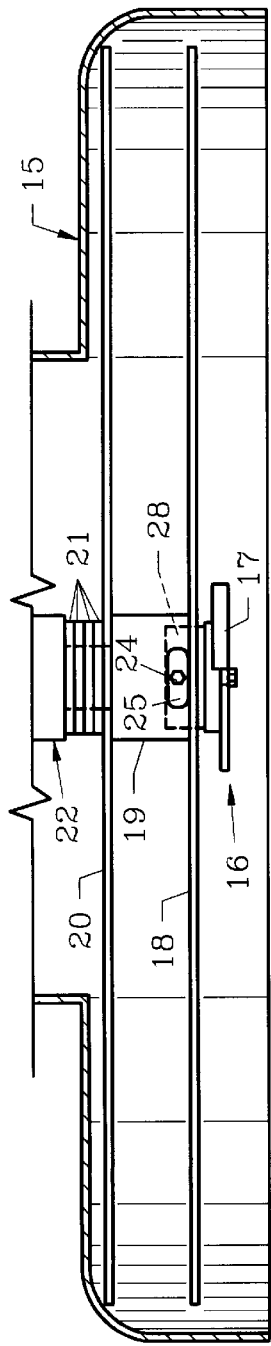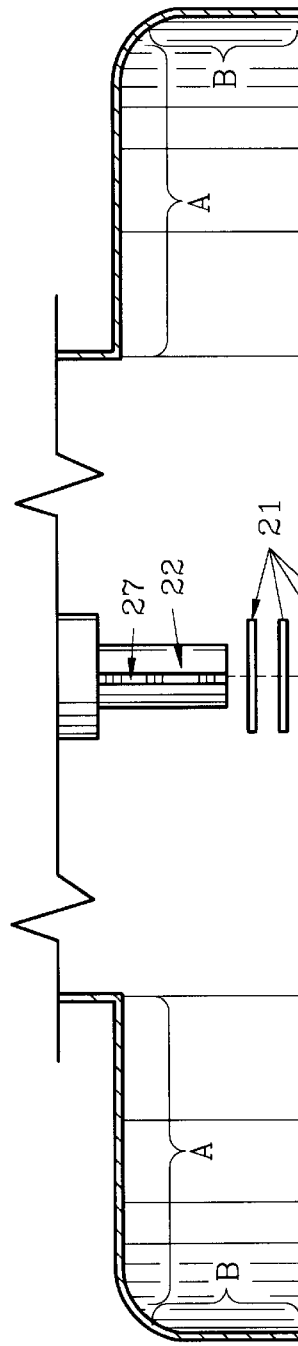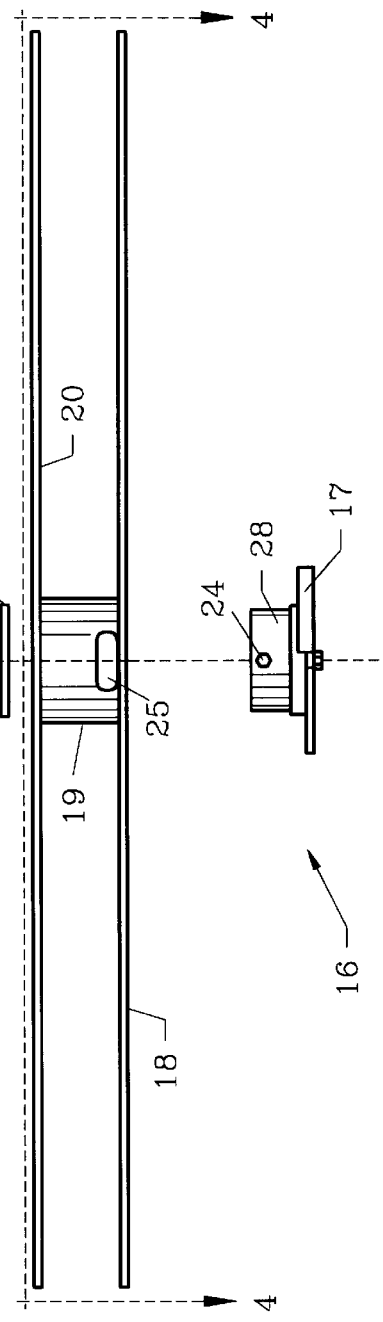

MOWER BLADE ASSEMBLY

BACKGROUND OF THE INVENTION

1. Field of the Invention

The invention herein pertains to lawnmower blades and in particular to lawnmower blades which clean and maintain the interior of the blade housing free from accumulating grass clippings.

2. Description of the Prior Art and Objectives of the Invention

Most operators of lawnmowers realize that grass cutting can be more easily and efficiently performed if the grass is dry and relatively short. However, cutting such ideal grass is rare due to changing temperatures, relative humidity and the necessary schedules of the lawnmower operators. For example, a typical lawn may require cutting only once in a two or three week period during hot, dry summer conditions, whereas during periods of heavy rain the same lawn may require cutting twice a week. Also, it may be more desirable to mow the lawn after the morning dew has evaporated, however, due to the operator's workload, early morning may be the only time available.

In typical manual, self-propelled or riding lawnmowers, the blade housing can become quickly clogged with wet grass clippings, causing the blades to terminate rotation. Even if the blades do not fully stop, the efficiency of the lawnmower greatly decreases when burdened with accumulated wet clippings. Attempts in the past have been made to remedy this problem as set forth in U.S. Pat. No. 3,959,955. However, there remains the need for a blade assembly which will effectively and efficiently maintain the housing clear of substantial amounts of wet grass clippings and it is, therefore, one objective of the present invention to provide a blade assembly which will prevent wet grass clippings from accumulating along the housing and which is relatively safe to use and inexpensive to purchase.

It is also an objective of the present invention to provide a lawnmower blade assembly which will fit a wide variety of standard lawnmowers.

It is a further objective of the present invention to provide a lawnmower blade assembly which includes first and second fan blades which fit within the blade housing.

It is yet another objective of the present invention to provide a blade assembly which includes first and second fan blades which are circumferentially displaced for maximum efficiency.

It is still a further objective of the present invention to provide a blade assembly having first and second fan blades which are relatively light in weight to reduce the load on the engine.

Various other objectives and advantages of the present invention will become apparent to those skilled in the art as a more detailed description is set forth below.

SUMMARY OF THE INVENTION

A blade assembly is provided for various internal combustion engine or electric powered lawnmowers. The blade assembly of the invention includes a first and a second fan blade which have a primary spacer therebetween to axially space the fan blades for maximum efficiency. The fan blades are also circumferentially displaced to maintain a high turbulence within the blade housing to prevent the buildup of grass trimmings, particularly when operating under damp or wet conditions. The fan blades can be independently made or integrally formed and are easily positioned on the engine shaft, above the cutting blade, by first removing the cutting blade and through the use of spacers as required. A keyway in the engine shaft allows the fan blades to be secured thereto while an Allen screw in the cutting blade hub permits the cutting blade to be tightened to the engine shaft through a slot contained within the primary fan blade spacer.

BRIEF DESCRIPTION OF THE DRAWINGS

FIG. 2 demonstrates an enlarged cross-sectional view of the blade housing showing the blade assembly in place therein;

FIG. 3 shows the blade assembly as seen in FIG. 2 but in exploded fashion; and

DETAILED DESCRIPTION OF THE PREFERRED EMBODIMENT

Figure 1:
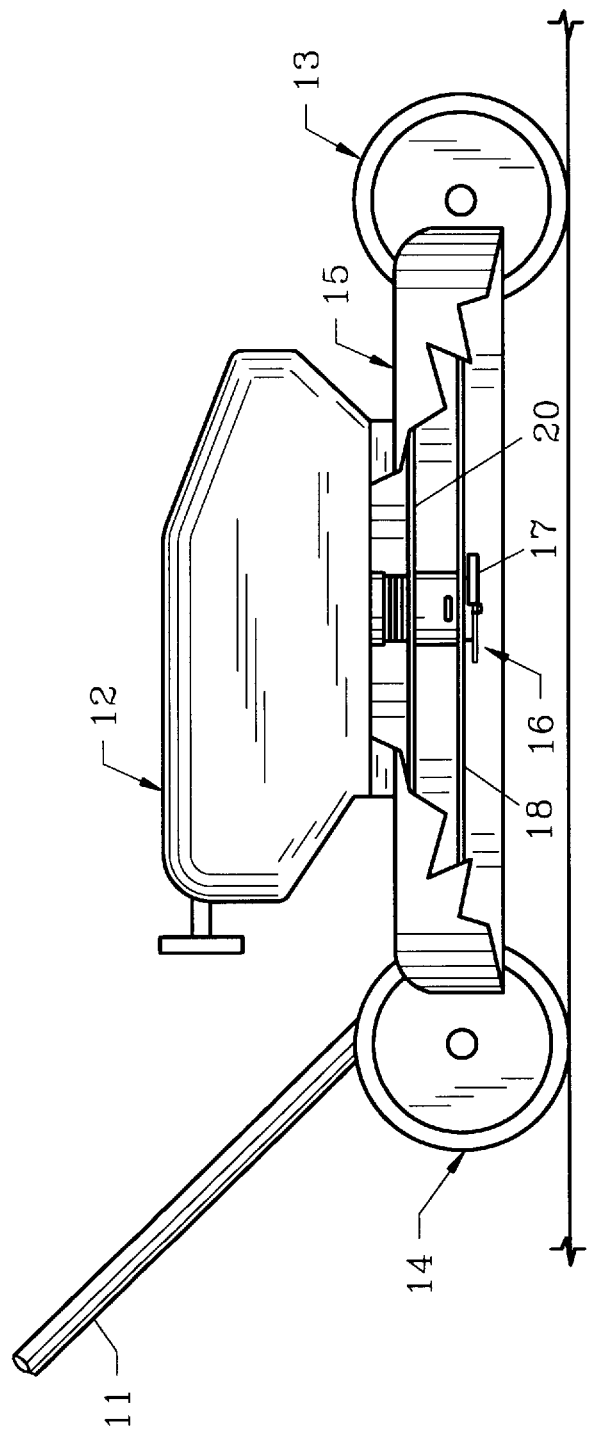
FIG. 1 illustrates a gasoline engine powered lawnmower with the blade assembly contained within the cutaway blade housing.

For a better understanding of the invention and its operation turning now to the drawings, FIG. 1 shows a typical gasoline powered push-type lawnmower 10 having a handle (fragmented) 11, an engine compartment 12, left front wheel 13, left rear wheel 14 and blade housing 15 cut-away for viewing with the preferred blade assembly 16 shown therein. Right side wheels have been removed for clarity in illustrating blade housing 15 and blade assembly 16 in more detail.

As would be understood, other types of lawnmowers, electric, self-propelled, riding or other types could likewise be used with the blade assembly described herein.

In FIG. 2, housing 15 is shown in cross-sectional view with preferred blade assembly 16 contained therein. Blade assembly 16 includes cutting blade 17, first fan blade 18, primary spacer 19, second fan blade 20 and a plurality of thin, secondary spacers 21, all affixed to motor shaft 22.

In FIG. 3, blade assembly 16 is shown in exploded fashion with cutting blade 17 having hub 28 attached thereto. Blade hub 28 is attached such as by welding or the like to cutting blade 17 as is conventionally sold with mower 10. First fan blade 18, as shown in FIG. 2 is spaced from cutting blade 17 and is likewise axially spaced from second fan blade 20 by primary spacer 19 which may be integrally formed with first fan blade 18 and second fan blade 20 such as by casting or welding thereto, depending on the particular materials and production methods utilized. Secondary spacers 21 comprise circular washers which slide onto motor shaft 22 as shown in FIG. 2, and adjustably space second fan blade 20 from the top of housing 15. While first fan blade 18 and second fan blade 20 are integrally formed as shown in FIG. 3, blades 18, 20 and primary spacer 19 could likewise be independently formed and positioned on shaft 22. Each fan blade 18 and 20 comprises a flat planar member having the flat surface parallel to the ground. Blade assembly 16 is secured to engine shaft 22 by Allen screw 24 shown in FIG. 3.

During mowing of grass which is damp or wet, grass clippings tend to collect along the inner walls of blade housing 15, specifically along areas A and B shown in FIG. 3. Once enough grass clippings collect therealong, mower 10 will have to be stopped and such clippings removed in order to continue cutting. At times grass clippings may collect along areas A and B without "choking" or completely stopping the engine, however, such clippings add weight to mower 10 and reduce the cutting efficiency. It has thus been found that by adding a single fan blade that increased cutting efficiency is obtained while adding a pair of spaced apart, circumferentially spaced fan blades as herein described, allows the mower to operate at a greatly improved efficiency under very wet grass conditions, even when cutting longer grasses.

Figure 4:
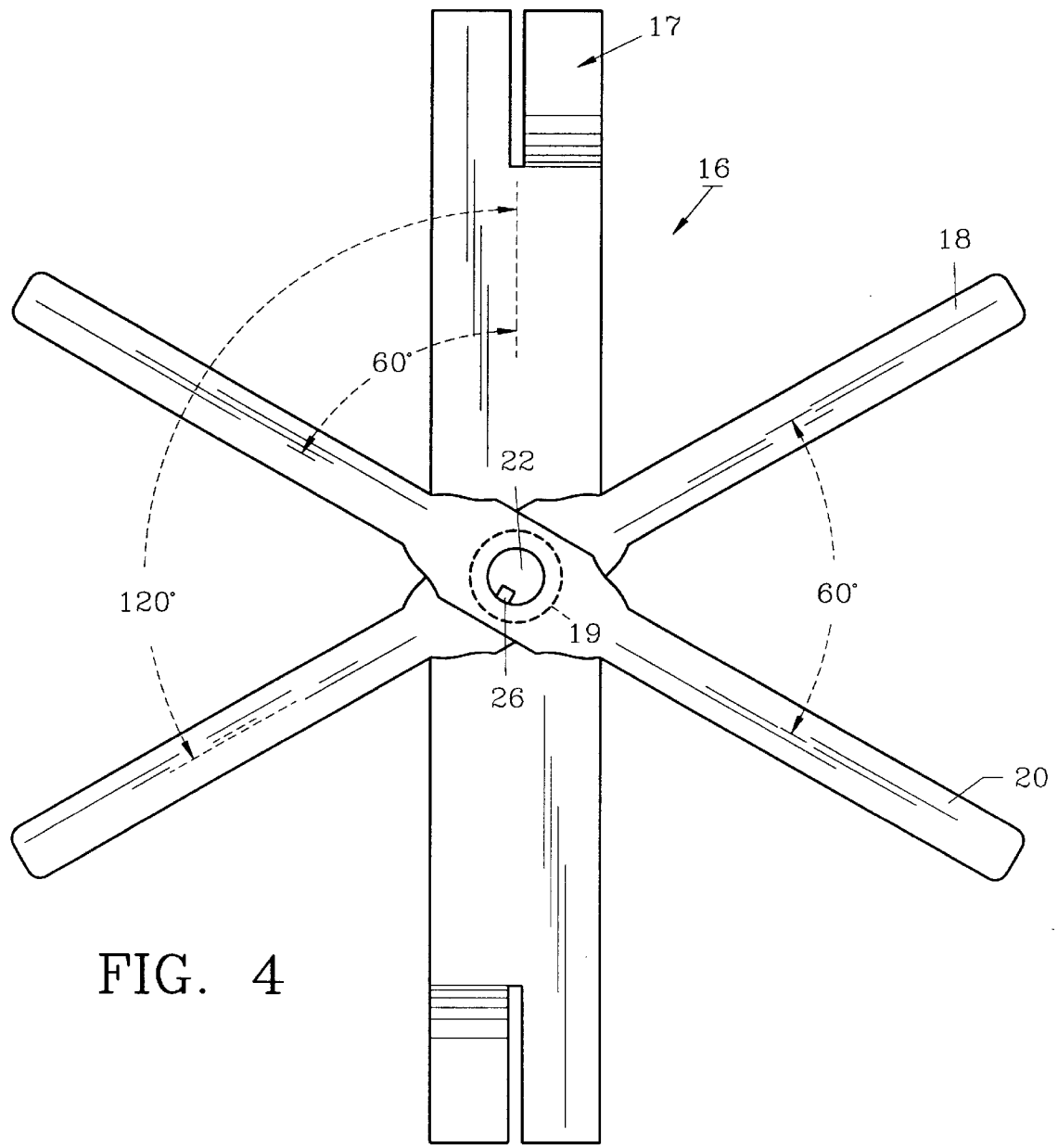
FIG. 4 demonstrates a top view along line 4—4 as seen in FIG. 3 of the blade assembly.

To further improve the efficiency of blade assembly 16, the preferred circumferential displacements of fan blades 18 and 20 are as illustrated in FIG. 4 as seen along lines 4—4 in FIG. 3. Cutting blade 17 is standard in the industry and has approximately twice the width of either first fan blade 18 and second fan blade 20 and includes a curved cutting surface for mulching grass as it is cut. As seen, first fan blade 18 is circumferentially displaced approximately 120° from cutting blade 17 whereas second fan blade 20 is circumferentially displaced approximately 60° from cutting blade 17. This circumferential displacement has proved to be the most effective and provides the greatest benefit for maintaining housing areas A and B, as shown in FIG. 3, free of excess wet grass accumulation.

First fan blade 18, primary spacer 19 and second fan blade 20 are preferably formed from aluminum. Aluminum has been selected due to its relatively low density when compared to steel cutting blade 17 in order to reduce the load on engine shaft 22. Suitable polymeric materials may likewise be used, however, breakage of fan blades 18 and 20 can prove hazardous to the operator and such plastic or other materials must be carefully chosen for safety purposes.

Various changes and modifications can be made to the invention as described herein and the examples and illustrations are merely for explanatory purposes and are not intended to limit the scope of the pending claims.

I clam:

1. A blade assembly for a lawn mower shaft comprising:
   a curved, mulching, cutting blade,
   a first flat fan blade, said first fan blade axially aligned with said cutting blade and spaced therefrom,
   a second flat fan blade, said second fan blade axially aligned with said first fan blade and spaced therefrom,
   said first fan blade circumferentially displaced from said cutting blade and from said second fan blade,
   said first and second fan blades positioned above said cutting blade
   said first and second fan blades each having a width less than the width of the cutting blade
   said first fan blade having a density less than the density of said cutting blade.

2. The blade assembly of claim 1 further comprising a primary spacer, said primary spacer between said cutting blade and said first fan blade.

3. The blade assembly of claim 1 wherein said first and said second fan blade are integrally formed.

4. The blade assembly of claim 1 wherein said first and said second fan blades are aluminum.

5. The blade assembly of claim 1 wherein said first and second fan blades are substantially equally sized.

6. The blade assembly of claim 5 wherein said cutting blade has a width approximately twice the width of said first fan blade.

7. The blade assembly of claim 1 wherein said second fan blade has a density less than the density of said cutting blade.

8. A blade assembly comprising:
   a motor shaft,
   a single cutting blade, said cutting blade including a curved cutting surface, said cutting blade positioned on said shaft,
   a first fan blade, said first fan blade positioned on said shaft and spaced above said cutting blade, said first fan blade circumferentially displaced from said cutting blade,
   a second fan blade, said second fan blade positioned on said shaft and spaced above said first fan blade, said second fan blade circumferentially displaced from said cutting blade and said first fan blade,
   said first and second fan blades having a density less than said cutting blade.

9. The blade assembly of claim 8 further comprising a primary spacer, said primary spacer positioned on said shaft between said cutting blade and said first fan blade.

10. The blade assembly of claim 8 wherein said first fan blade is rigidly attached to said second fan blade.

11. The blade assembly of claim 8 further comprising a primary spacer, said primary spacer positioned between said first and said second fan blades.

12. The blade assembly of claim 11 further comprising a secondary spacer, said secondary spacer positioned on said shaft above said first fan blade.

13. In a lawn mower including a housing and a shaft, the improvement comprising a blade assembly, said blade assembly comprising:
   a) a single mulching, cutting blade;
   b) a first fan blade, said first fan blade axially aligned with and spaced above said cutting blade, said first fan blade circumferentially displaced from said cutting blade;
   c) a second flat fan blade, said second fan blade axially aligned with and spaced above said cutting blade, said second flat fan blade circumferentially displaced from said cutting blade and said first fan blade, said first and second fan blades each having a width less than the width of said cutting blade, said first and said second fan blade having a density less than the density of said cutting blade, said first and said second fan blades shorter than said cutting blade;
   d) a primary spacer, said primary spacer positioned on said shaft between said cutting blade and said first fan blade; and
   e) a secondary spacer, said secondary spacer positioned on said shaft between said first fan blade and said housing.

14. The blade assembly of claim 13 wherein said fan blades are aluminum.

15. The blade assembly of claim 14 wherein the circumferential spacing between said first fan blade and said cutting blade is sixty degrees.

16. The blade assembly of claim 15 wherein the circumferential spacing between said first fan blade and said second fan blade is sixty degrees, and wherein the circumferential spacing between said second fan blade and said cutting blade is sixty degrees.

* * * * *